United States Patent
Bissinger et al.

(10) Patent No.: US 10,479,067 B2
(45) Date of Patent: Nov. 19, 2019

(54) MULTILAYER ARTICLES COMPRISING A RELEASE SURFACE AND METHODS THEREOF

(71) Applicant: 3M INNOVATIVE PROPERTIES COMPANY, St. Paul, MN (US)

(72) Inventors: Peter Bissinger, Diessen (DE); Michael C. Dadalas, Burghausen (DE); Philipp Doebert, Seefeld (DE); Rainer A. Guggenberger, Herrsching (DE); Klaus Hintzer, Kastl (DE); Tilman C. Zipplies, Burghausen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 65 days.

(21) Appl. No.: 15/561,082

(22) PCT Filed: Apr. 1, 2016

(86) PCT No.: PCT/US2016/025533
§ 371 (c)(1),
(2) Date: Sep. 25, 2017

(87) PCT Pub. No.: WO2016/161271
PCT Pub. Date: Oct. 6, 2016

(65) Prior Publication Data
US 2018/0257361 A1    Sep. 13, 2018

Related U.S. Application Data (60) Provisional application No. 62/141,334, filed on Apr. 1, 2015, provisional application No. 62/141,344, filed on Apr. 1, 2015.

(51) Int. Cl.
*B32B 37/24* (2006.01)
*B32B 37/26* (2006.01)
(Continued)

(52) U.S. Cl.
CPC ............. *B32B 37/24* (2013.01); *A47J 36/025* (2013.01); *B05D 3/0254* (2013.01); *B05D 5/086* (2013.01);
(Continued)

(58) Field of Classification Search
CPC ....... A47J 36/025; C09D 5/03; C09D 127/18; B05D 7/14; B05D 5/083; B05D 3/0272;
(Continued)

(56) References Cited

U.S. PATENT DOCUMENTS 3,473,952 A    10/1969  McFadden
4,743,658 A     5/1988  Imbalzano
(Continued)

FOREIGN PATENT DOCUMENTS

EP    1526142    2/2007
EP    1538177    6/2008
(Continued)

OTHER PUBLICATIONS

International Search Report for PCT International Application No. PCT/US2016/025533, dated Nov. 10, 2016, 4 pages.

*Primary Examiner* — Brian Handville
(74) *Attorney, Agent, or Firm* — Thomas M. Spielbauer (57) ABSTRACT

Described herein is multilayer article made by the process comprising: delivering particles comprising a silicon compound from at least one fluid jet to a metal surface to embed the metal surface with the silicon compound to form a silicon compound layer; coating the silicon compound layer with an aqueous fluoropolymer dispersion to form a fluoropolymer layer and thereby forming a multilayered article, wherein the aqueous fluoropolymer dispersion comprises (i) a modifying agent; and (ii) a fluorinated polymer, wherein the fluorinated polymer comprises at least one of (a) a partially fluorinated polymer capable of forming a carbon-
(Continued)

carbon double bond, (b) a functionalized fluorinated polymer, and (c) combinations thereof; and sintering the multilayered article to form the release surface coated substrate.

20 Claims, 1 Drawing Sheet (51) Int. Cl.

| | | |
|---|---|---|
| C09D 127/18 | (2006.01) | |
| A47J 36/02 | (2006.01) | |
| C08K 3/013 | (2018.01) | |
| B32B 15/18 | (2006.01) | |
| B32B 15/20 | (2006.01) | |
| B32B 27/14 | (2006.01) | |
| C08K 5/17 | (2006.01) | |
| C08K 5/54 | (2006.01) | |
| C08L 27/12 | (2006.01) | |
| B05D 5/08 | (2006.01) | |
| B05D 7/00 | (2006.01) | |
| B05D 3/02 | (2006.01) | |

(52) U.S. Cl.
CPC ............ *B05D 7/542* (2013.01); *B32B 15/18* (2013.01); *B32B 15/20* (2013.01); *B32B 27/14* (2013.01); *B32B 37/26* (2013.01); *C08K 3/013* (2018.01); *C08K 5/17* (2013.01); *C08K 5/54* (2013.01); *C08L 27/12* (2013.01); *C09D 127/18* (2013.01); *B05D 2202/10* (2013.01); *B05D 2506/10* (2013.01); *B32B 2037/243* (2013.01); *B32B 2037/268* (2013.01); *B32B 2255/06* (2013.01); *B32B 2255/10* (2013.01); *B32B 2255/20* (2013.01); *B32B 2255/26* (2013.01); *B32B 2264/102* (2013.01); *B32B 2264/105* (2013.01); *B32B 2264/108* (2013.01); *B32B 2307/702* (2013.01); *B32B 2311/24* (2013.01); *B32B 2311/30* (2013.01); *C08L 2205/025* (2013.01); *C08L 2207/53* (2013.01)

(58) Field of Classification Search
CPC ......... B05D 1/12; B05D 7/542; B32B 15/08; B32B 15/085; B32B 27/08; B32B 7/06; B32B 15/18; B32B 15/20; B32B 27/322; B32B 2307/732; B32B 2250/04; B32B 2255/06; B32B 2255/20; B32B 2260/02; B32B 2260/046; B32B 2307/406; B32B 2307/538; B32B 2307/584; B32B 2307/714; C08K 2003/2227; C08K 3/22
See application file for complete search history.

(56) References Cited

U.S. PATENT DOCUMENTS

| | | | |
|---|---|---|---|
| 5,024,711 | A | 6/1991 | Gasser |
| 5,071,695 | A | 12/1991 | Tannenbaum |
| 5,185,184 | A | 2/1993 | Koran |
| 5,424,133 | A | 6/1995 | Eckhardt |
| 5,998,034 | A | 12/1999 | Marvil et al. |
| 6,911,512 | B2 | 6/2005 | Jing |
| 7,342,081 | B2 | 3/2008 | Chandler |
| 7,589,140 | B2 | 9/2009 | Chandler |
| 7,597,939 | B2 | 10/2009 | Hennessey |
| 7,754,795 | B2 | 7/2010 | Hintzer |
| 8,007,863 | B2 | 8/2011 | Chandler |
| 8,119,183 | B2 | 2/2012 | O'Donoghue |
| 8,354,173 | B2 | 1/2013 | Jing |
| 8,889,779 | B2 | 11/2014 | McKeen |
| 2002/0150778 | A1 | 10/2002 | Leech et al. |
| 2003/0129400 | A1 | 7/2003 | Jones |
| 2006/0110601 | A1 | 5/2006 | Hennessey |
| 2007/0015937 | A1 | 1/2007 | Hintzer |
| 2008/0274671 | A1* | 11/2008 | O'Donoghue ...... A61F 2/30767 451/39 |
| 2009/0235591 | A1 | 9/2009 | Yener |
| 2010/0211158 | A1 | 8/2010 | Haverty |
| 2011/0293946 | A1 | 12/2011 | Cao |
| 2012/0034448 | A1 | 2/2012 | Liu |
| 2012/0295119 | A1 | 11/2012 | David |
| 2013/0059101 | A1* | 3/2013 | Aten .................. B29C 47/0016 428/35.7 |
| 2015/0050488 | A2 | 2/2015 | Junk |

FOREIGN PATENT DOCUMENTS

| | | |
|---|---|---|
| WO | WO 1996-013556 | 5/1996 |
| WO | WO 2008-033867 | 3/2008 |
| WO | WO 2010-080202 | 7/2010 |
| WO | WO 2016-161233 | 10/2016 |
| WO | WO 2016-161264 | 10/2016 |

* cited by examiner

MULTILAYER ARTICLES COMPRISING A RELEASE SURFACE AND METHODS THEREOF

CROSS REFERENCE TO RELATED APPLICATIONS

This application is a national stage filing under 35 U.S.C. 371 of PCT/US2016/025533, filed Apr. 1, 2016, which claims the benefit of U.S. Application No. 62/141,334, filed Apr. 1, 2015, and U.S. Application No. 62/141,344, filed Apr. 1, 2015 the disclosure of which are incorporated by reference in their entirety herein.

TECHNICAL FIELD

A multilayer article comprising a fluoropolymer release coating, which minimizes sticking, is described along with methods of making such an article.

BACKGROUND

Fluorinated polymers such as polymers of tetrafluoroethylene (TFE) are well known for their superior heat resistance, chemical resistance, corrosion resistance, and anti-stick properties. Because of these properties, polymers of TFE have found a wide range of applications including use as release (also called non-stick) coatings on metal substrates such as cookware including cook, bake, and frying articles.

It is known that the adhesion of fluoropolymers to metal is rather low. A non-fluorinated heat resistant binder can be used in non-stick finishes for adhering fluoropolymers to substrates and for film-forming. The binder can be non-melt processible (meaning it does not exhibit melt-flow behavior) such as polyimides, polyamides, polybenzimidazoles, polyamide-imides, polysulfones, polybismaleimides, and liquid crystal polymers; or melt processible, such as polyethersulfone, polyphenylene sulfide, and polyaryleneeetherketone.

SUMMARY

There is a desire for an alternative method of making multilayer articles having a release surface formed from an aqueous fluoropolymer dispersion. In one embodiment, there is a desire to use a method which is free of binder.

In one aspect, a release surface coated substrate is described made by a process comprising:
delivering particles comprising a silicon compound from at least one fluid jet to a metal surface to embed the metal surface with the silicon compound to form a silicon compound layer;
coating the silicon compound layer with an aqueous fluoropolymer dispersion to form a fluoropolymer layer and thereby forming a multilayered article, wherein the aqueous fluoropolymer dispersion comprises (i) a modifying agent; and (ii) a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
sintering the multilayered article to form the release surface coated substrate.

In one aspect, a release surface coated substrate is described made by a process comprising:
delivering particles comprising a silicon compound from at least one fluid jet to a metal surface to embed the metal surface with the silicon compound to form a silicon compound layer;
coating the silicon compound layer with a coating comprising a coupling agent to form a coupling layer;
coating the coupling layer with an aqueous fluoropolymer dispersion to form a fluoropolymer layer and thereby forming a multilayered article, wherein the aqueous fluoropolymer dispersion comprises a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
sintering the multilayered article to form the release surface coated substrate.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more;
"and/or" is used to indicate one or both stated cases may occur, for example A and/or B includes, (A and B) and (A or B);
"backbone" refers to the main continuous chain of the polymer;
"cure site monomer" refers to a monomer comprising a terminal functional group, such that the functional group can participate in a subsequent crosslinking reaction; and
"interpolymerized" refers to monomers that are polymerized together to form a polymer backbone.

The term "perfluorinated" refers to a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Figure 1:
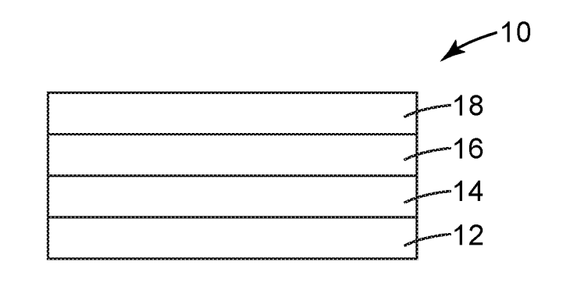
FIG. 1 is an exemplary embodiment of a release surface coated substrate of the present disclosure.

Shown in FIG. 1 is an exemplary embodiment of a multilayered article of the present invention. Release coated substrate 10, comprises silicon compound layer 14, which is sandwiched between metal substrate 12 and fluoropolymer layer 16. Silicon compound layer 14 is in direct contact with metal substrate 12 and fluoropolymer layer 16, wherein silicon compound layer 14 contacts metal substrate 12 and fluoropolymer layer 16. The multilayer article may comprise additional layers (e.g., layer 18) on top the fluoropolymer layer 16, opposite silicon compound layer 12.

The metal substrates of the present disclosure include those substrates typically found useful in cookware articles such as metals selected from carbon steel (e.g., high-carbon steel, stainless steel, aluminized steel), stainless steel, aluminum, aluminum alloys, and combinations thereof.

Silicon compound layer 14 is disposed on the metal substrate and is used to attach the fluoropolymer layer to the metal substrate. To form strong adhesion between the metal substrate and the fluoropolymer layer, it is advantageous for the silicon compound layer to continuously contact both the metal substrate and the fluoropolymer layer.

As will be described in more detail below, the silicon compound layer is formed by impinging hard particles at the surface of the metal substrate. In the present disclosure, the hard particles (i.e., particles having a hardness greater than that of the metal surface) comprise a silicon compound, which upon contact with the metal surface, some of the siliceous material becomes embedded in the surface of the metal. When a sufficient amount of silicon compound has been transferred to the surface it forms a silicon compound layer. In one embodiment, the metal substrate's surface becomes partially coated (for example less than 90, 80, 75, 50, or even 25%) with a silicon compound. Exemplary silicon compounds include, amorphous silica, silicon dioxide, silicic acid, and fumed silica. In one embodiment, the silicon compounds can be pre-reacted with a coupling agent to exhibit a functional group available for reaction with the fluorinated polymer.

The fluoropolymer layer of the present disclosure is made with an aqueous fluoropolymer dispersion, which can form a durable fluoropolymer layer used to provide an easy release coating to the underlying metal substrate. Aqueous fluoropolymer dispersions may be desirable to use over powders, because there is no dust to contain. Aqueous fluoropolymer dispersions may also be desirable to use over organic solvent-based fluoropolymer dispersions, because the organic solvent based dispersion can comprise large amounts of organic solvent, which need to be disposed of properly.

The aqueous fluoropolymer dispersion of the present disclosure comprises a fluorinated polymer selected from a partially fluorinated polymer that is capable of forming carbon-carbon double bonds along the partially fluorinated polymer chain, a fluorinated polymer comprising a functional group, and combinations thereof.

The partially fluorinated polymer of the present disclosure comprises a plurality of units capable of forming a carbon-carbon double bond along the partially fluorinated polymer chain. In one embodiment, the partially fluorinated polymer is capable of forming carbon-carbon double bonds along the backbone of the polymer. In another embodiment, the partially fluorinated amorphous fluoropolymer is capable of forming carbon-carbon double bonds in a pendent group off of the backbone of the polymer.

The partially fluorinated polymer capable of forming carbon-carbon double bonds means that the polymer contains units capable of forming double bonds. Such units include, for example, two adjacent carbons, along the polymer backbone or pendent side chain, wherein a hydrogen is attached to the first carbon and a leaving group is attached to the second carbon. During an elimination reaction (e.g., thermal reaction, and/or use of acids or bases), the leaving group and the hydrogen leave forming a double bond between the two carbon atoms. An exemplary leaving group includes: a halide, an alkoxide, a hydroxide, a tosylate, a mesylate, an amine, an ammonium, a sulfide, a sulfonium, a sulfoxide, a sulfone, and combinations thereof. Also contemplated would be a fluorinated polymer comprising adjacent carbons either having both bromine or both iodine atoms attached, resulting in the leaving of $Br_2$ or $I_2$. In one embodiment, the partially fluorinated polymer capable of forming a carbon-carbon double bond comprises —$CH_2$—$CF_2$— units.

The partially fluorinated polymer capable of forming carbon-carbon double bonds comprises a plurality groups capable of forming double bonds to ensure a sufficient interaction with the silicon compound layer or silanized silicon compound layer. Generally, this means at least 0.1, 0.5, 1, 2, or even 5 mol % at most 7, 10, 15, or even 20 mol % (i.e., moles of these carbon-carbon double bond precursors per mole of polymer).

In one embodiment, the partially fluorinated polymer capable of forming carbon-carbon double bonds is derived from at least one hydrogen containing monomer such as vinylidene fluoride.

In one embodiment, the partially fluorinated polymer capable of forming carbon-carbon double bonds comprises adjacent copolymerized units of vinylidene fluoride (VDF) and hexafluoropropylene (HFP); copolymerized units of VDF (or tetrafluoroethylene) and a fluorinated comonomer capable of delivering an acidic hydrogen atom to the polymer backbone, such as trifluoroethylene; vinyl fluoride; 3,3,3-trifluoropropene-1; pentafluoropropene (e.g., 2-hydmpentafluoropropylene and 1-hydropentafluoropropylene); 2,3,3,3-tetrafluoropropene; and combinations thereof.

In one embodiment, the partially fluorinated polymer capable of forming carbon-carbon double bonds is additionally derived from a hydrogen containing monomer including: pentafluoropropylene (e.g., 2-hydropentafluropropylene), propylene, ethylene, isobutylene, and combinations thereof.

In one embodiment, the partially fluorinated polymer capable of forming carbon-carbon double bonds is additionally derived from a perfluorinated monomer. Exemplary perfluorinated monomers include: hexafluoropropene; tetrafluoroethylene; chlorotrifluoroethylene; perfluoro(alkylvinyl ether) such as perfluoromethyl vinyl ether, perfluoralkoxyvinylether such as $CF_2$=$CFOCF_2CF_2CF_2OCF_3$, $CF_2$=$CFOCF_2OCF_2CF_2CF_3$, $CF_2$=$CFOCF_2OCF_2CF_3$, and $CF_2$=$CFOCF_2OCF_3$, perfluoro(alkylallyl ether) such as perfluoromethyl allyl ether, perfluoro(alkyloxyallyl ether) such as perfluoro-4,8-dioxa-1-nonene (i.e., $CF_2$=$CFCF_2OCF_2)_3OCF_3$], and combinations thereof.

Exemplary types of partially fluorinated polymers capable of forming carbon-carbon double bonds include those comprising interpolymerized units derived from (i) vinylidene fluoride, tetrafluoroethylene, and propylene; (ii) vinylidene fluoride, tetrafluoroethylene, ethylene, and perfluoroalkyl vinyl ether, such as perfluoro(methyl vinyl ether); (iii) vinylidene fluoride with hexafluoropropylene; (iv) hexafluoropropylene, tetrafluoroethylene, and vinylidene fluoride; (v) hexafluoropropylene and vinylidene fluoride, (vi) vinylidene fluoride and perfluoroalkyl vinyl ether; (vii) vinylidene fluoride, tetrafluoroethylene, and perfluoroalkyl vinyl ether, (viii) vinylidene fluoride, perfluoroalkyl vinyl ether, hydropentafluoroethylene and optionally, tetrafluoroethylene; (ix) tetrafluoroethylene, propylene, and 3,3,3-trifluoropropene; (x) tetrafluoroethylene, and propylene; (xi) ethylene, tetrafluoroethylene, and perfluoroalkyl vinyl ether, and optionally 3,3,3-trifluompropylene; (xii) vinylidene fluoride, tetrafluoroethylene, and perfluoroalkyl allyl ether, (xiii) vinylidene fluoride and perfluoroalkyl allyl ether; (xiv) ethylene, tetrafluoroethylene, and perfluoroalkyl vinyl ether, and optionally 3,3,3-trifluoropropylene; (xv) vinylidene fluoride, tetrafluoroethylene, and perfluoroalkyl vinyl ether, (xvi) vinylidene fluoride and perfluoroalkyl allyl ether; (xvii) vinylidene fluoride, tetrafluoroethylene, and perfluoroalkyloxyallyl ether, (xviii) vinylidene fluoride and perfluoroalkyloxyallyl ether; (xiv) vinylidene fluoride, tetrafluoroethylene, and perfluoroalkyloxyallyl ether, (xv) vinylidene fluoride and perfluoroalkyloxyallyl ether; and (xvi) combinations thereof. Preferred partially fluorinated polymers include, polymers derived from vinylidene fluoride (VDF) such a homopolymer (PVDF) or copolymers (such as a copolymer of tetrafluoroethylene, hexafluoropropylene and vinylidene fluoride), copolymers of ethylene and tetrafluoroethylene (ETFE), and copolymers of tetrafluoroethylene and propylene (TFEP).

In addition or alternatively, the fluorinated polymer of the present disclosure may comprising a plurality of functional groups. Such functional groups include:

(A) —COX groups wherein X is OH, ONa, OK, $NH_2$, F, or Cl;
(B) —$SO_2$X groups wherein X is OH, ONa, OK, $NH_2$, F, or Cl;
(C) —$CH_2SO_3$Y (sulfate) groups wherein Y=OH, ONa, or OK;
(D) —$CH_2$OH groups;
(E) phosphate groups such as —$PO_3^-$ and —$OPO_3^-$;
(F) —CN groups;
(G) a halogen selected from —Br, —I, and —Cl; and
(H) combinations thereof.

The reactive groups (A)-(G) are terminal groups located at the ends of the fluoropolymer chains or at the end of a side chain along the main carbon backbone of the fluoropolymer. Typically, the fluoropolymer comprises at least 2, 3, 5, 10, 50, 100, 500, or even 1000; and at most 5000, 7000, or even 10000 of these groups per 1 million carbon atoms.

These reactive groups can be introduced into the fluoropolymer during its polymerization (e.g., aqueous emulsion polymerization) and/or through the use of particular monomers, initiators, chain transfer agents, etc. Exemplary introduction of these reactive groups is disclosed further below.

The terminal (A) groups can be formed through the use of a radical forming initiator such as persulfate, such as ammonium or potassium persulfate, or a permanganate such as potassium permanganate. Alternatively or additionally, the fluoropolymer may comprise the terminal (A) groups because it is polymerized with monomers comprising the —COX groups or groups that can be converted into the —COX groups (e.g., nitrile groups). Exemplary comonomers include functionalized vinyl ethers or maleic anhydride. Alternatively or additionally, the terminal (A) groups may be formed when a chain transfer agent comprising a —COX group is used during the polymerization. The fluoropolymers comprising the terminal (A) groups can be determined by FT-IR using the method as described in columns 4 and 5 of U.S. Pat. No. 4,743,658 (Imbalzano et al.).

The terminal (B) groups can be formed through the use of persulfate/sulfite initiator systems. For example —$SO_3^-$ groups can be favored based on the ratio of persulfate/sulfite used. In one embodiment, —$SO_3^-$ groups are present along with —COX groups. Alternatively or additionally, the fluoropolymer may comprise the terminal (B) groups because it is polymerized with monomers comprising —$SO_2$X groups. Alternatively or additionally, the terminal (B) groups may be formed when a chain transfer agent comprising a —$SO_2$X group is used during the polymerization.

The terminal (C) groups can be formed through the use of a persulfate initiator, such as ammonium or potassium persulfate.

The terminal (D) groups can be formed through the use of a chain transfer agent, such as an alcohols (e.g., methanol).

The fluorinated polymer may comprise the terminal (E) groups, when the fluorinated polymer is made using monomers containing these phosphate groups. The monomers may be non-fluorinated or fluorinated.

The terminal (F) groups can be formed through the use of nitrile cure site monomers, as are known in the art The terminal (G) groups can be formed through the use of cure site monomers or chain transfer agents comprising such halogens, both of which are known in the art.

In one embodiment, the fluorinated polymer in the aqueous fluoropolymer dispersion is a core-shell particle, comprising two different fluoropolymers. In one embodiment, the core-shell particle comprises a perfluorinated polymer core (such as PTFE) and a shell comprising (a) a partially fluorinated polymer capable of forming a carbon-carbon double bond, (b) a functionalized fluorinated polymer, and (c) combinations thereof.

In addition to the fluorinated polymer described above, the aqueous fluoropolymer dispersion which forms the fluoropolymer layer may also include additional fluorinated polymers such as: polytetrafluoroethylene (PTFE); or copolymers of tetrafluoroethylene with a perfluorinated monomer. Exemplary perfluorinated monomers include: perfluorinated vinyl ether such perfluorinated methyl vinyl ether, perfluorinated ethyl vinyl ether, and perfluoro n-propyl vinyl ether (PPVE-1), perfluoro-2-propoxypropylvinyl ether (PPVE-2), perfluoro-3-methoxy-n-propylvinyl ether and perfluoro-2-methoxy-ethylvinyl ether; or a perfluorinated C3 to C8 olefin, such as, for example, HFP.

In one embodiment, the fluoropolymer layer comprises a non-melt processable fluoropolymer. By the term "non-melt processable" is meant that the melt viscosity of the homo- or copolymer of TFE is so high that conventional melt processing equipment cannot be used to process the polymer. This means in general that the melt viscosity is at least $10^{10}$ Pascal·seconds. In one embodiment, the fluoropolymer layer comprises at least 1, 2, 4, 5, or even 10%; and at most 75, 80, 90, 95, 99, or even 100% by weight of a non melt-processable polymer based on the total weight of polymer.

In one embodiment, the fluoropolymer layer may comprise a perfluorinated melt-processable fluoropolymer such as e.g., a copolymer of TFE that is melt-processable. Examples of such copolymers include FEP (copolymers of tetrafluoroethylene and hexafluoropropylene) or PFA (perfluoroalkoxyl polymer) polymers. In one embodiment, the fluoropolymer layer comprises at least 1, 2, 4, 5, or even 10%; and at most 75, 80, 90, 95, 99, or even 100% by weight of a melt-processable polymer based on the total weight of polymer.

In one embodiment, the aqueous fluoropolymer dispersion comprises a non-melt processable PTFE; perfluoroalkoxyl polymer (PFA); copolymers of tetrafluoroethylene and hexafluoropropylene (FEP); a copolymer of ethylene and tetrafluoroethylene (ETFE); a copolymer of tetrafluoroethylene, hexafluoropropylene, and vinylidene fluoride (THV); and blends thereof. The fluoropolymer layer can comprise additives to improve, for example, the durability, scratch resistance, and/or aesthetics of the layer. Exemplary additives include, colloidal silica, mica, fillers (such as carbon black, silicium nitride, boronitride, titanium carbonitride, etc.), coloring agents, levelling agents, adhesion promoters and tackifiers. The composition may further include in particular film hardeners as disclosed in WO 96/13556 (Tannenbaum). Examples of film hardeners include silicate compounds, such as metal silicates e.g. aluminium silicate, and metal oxides such as titanium dioxide, and aluminium oxide, and carbides e.g silicon carbide.

Typically, these additives are added in the second fluoropolymer layer in a weight % of no more than 1, 2, 5, 8 or even 10%.

Typically the fluoropolymer layer has a thickness of at least 5, 10, 20, 25, 50, 75, or even 100 micrometer; and at most 500, 600, 800, or even 1000 micrometers.

In order to achieve sufficient bonding between the silicon compound layer and the fluoropolymer layer, a modifying agent is needed. In one embodiment, a modifying agent is added to the aqueous fluoropolymer dispersion, which modifies the surface of the silicon compound layer forming a functionalized surface, which can then bond to the fluoropolymer layer. In another embodiment, the silicon compound layer is functionalized using coupling agent prior to contacting with the aqueous fluoropolymer dispersion. The silicon compound layer can be functionalized by (i) applying a coupling agent applied directly to the formed silicon compound layer and/or (ii) functionalizing the silicon compound prior to contact with the metal substrate.

The fluorinated polymer disclosed above reacts with the modifying agent to form sufficient adhesion to the silicon compound layer of the metal surface. Such modifying agents include a coupling agent, an activating agent, and combinations thereof.

A coupling agent is a compound which can bond with both organic and inorganic materials. Such coupling agents include silanes, titanates, and zirconates. Exemplary coupling agents include: vinyl trimethoxysilane, vinyl triethoxysilane, γ-glycidoxypropyl trimethoxysilane, γ-methacryloxy propyltrimethoxysilane, tetramethyl divinyl silazane, cinyltrimethoxysilane, vinyltriethoxysilane, 2-(3,4 epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, p-styrytrimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, N-2-(aminoethyl)-3-aminopropylmethyldimethoxysilane, N-2-(aminoethyl)-3-aminopropyltridimethoxysilane, 3-aminopropyltrimethoxysilane, 3-aminopropyltriethoxysilane, partially hydrolyzates of 3-triethoxysilyl-N-(1,3 dimethyl-butylidene) propylamine, N-phenyl-3-aminopropyltrimethoxysilane, N-(vinylbenzyl)-2-aminoethyl-3-aminopropyltrimethoxysilane hydrochloride, N-(vinylbenzyl)-2-aminoethyl-3-aminopropyltrimethoxysilane hydrochloride, hydrolysate, tris-(trimethoxysilylpropyl)isocyanurate, 3-ureidopropyltrialkoxysilane, 3-mercaptopropylmethyldimethoxysilane, 3-mercaptopropyltrimethoxysilane, bis (triethyoxysilylpropyl)tetrasulfide, 3-isocyanatepropyltriethoxysilane, and combinations therof Such coupling agents are commercially available from Shin-Etzu Chemical Co., Ltd., Tokyo, Japan and Kenrich Petrochemicals, Inc. Bayonne, N.J.

Typically the ratio of the coupling agent is at least 0.01%, 0.05%, 0.1%, or even 0.5%; and at most 5%, 2%, or even 1% by weight relative to the weight of the silicon compound.

An activating agent as disclosed herein is a compound that can react with the partially fluorinated polymer capable of forming carbon-carbon double bond to form a double bond. Such activating agents are selected from a base, an amine-containing compound (such as ammonia propyl amine, triethanolamine), a hydroxyl-containing compound, and combinations thereof.

Typically the ratio of the activating agent is at least 0.1%, 0.5%, or even 1%; and at most 30%, 20%, 15%, or even 10% by weight relative to the fluorinated polymer.

In one embodiment, fluoropolymer layer is the topcoat layer. In another embodiment, fluoropolymer layer 16 is an intermediate layer and thus, the multilayer article comprise additional layer 18. Additional layer 18 may include those layers known in the art, to enhance the properties and/or performance of the multilayer article, such as chemical resistance, smoothness, or gloss. For example, additional layer 18 may be a topcoat layer substantially comprising PTFE, in other words comprising no more than 5%, or even 1% by weight of a non-PTFE polymer. In another embodiment, additional layer 18 is a fluorothermoplast polymer layer substantially comprising PFA or FEP, in other words comprising no more than 5%, or even 1% by weight of a non-PFA or non-FEP polymer.

Although FIG. 1 depicts a multilayer article comprising three layers, the multilayer article of the present disclosure may comprise multiple layers to achieve the release coating. For example a gradient of layers can be used, for example, wherein the fluoropolymer composition gradually changes as one moves from the metal substrate to the outermost layer.

The present disclosure provides a method for making multilayered articles, wherein the silicon compound layer is formed by bombarding a metal substrate with silicon-containing abrasive particles so as to embed the metal surface with a siliceous material forming the silicon compound layer. This process can generate thin layers of the silicon compound layer onto a metal substrate and in the absence of solvents. In one embodiment of the present disclosure, the silicon compound layer has a thickness of at least 0.005, 0.05, 0.5, or even 1 micrometers and no more than 5, 6, 8, 9, or even 10 micrometers.

In the present disclosure, the metal substrate may be smooth or roughened. In one embodiment, the metal substrate is treated before use. The metal substrate may be chemically treated (e.g., chemical cleaning, etching, etc.) or abrasively treated (e.g., grit blasting, microblasting, water jet blasting, shot peening, ablation, or milling) to clean or roughen the surface prior to use. Because the presently disclosed method comprises abrasively treating the metal surface during the application of the siliceous material, advantageously, in one embodiment, the metal substrate is not treated prior to use.

The silicon compound layer of the present disclosure is provided through treating the metal substrate by impacting the surface of the metal substrate with abrasive particles comprising a silicon compound, and optionally in the presence of additives such as inorganic salts. Conventional surface bombardment techniques such as grit blasting, sand blasting, or shot peening can be used.

The silicon containing particles include, but are not limited to, shot or grit made from quartz, quartz glass, silica, silicate glass with at least 10 wt % silicon, silicon carbide, silicon nitride and/or pyrogenic silica.

Additionally, or alternatively, the silicon-containing particles may comprise an abrasive particle which is superficially coated with a silicon compound. Exemplary abrasive particles include, but are not limited to, shot or grit made from alumina, zirconia, barium titanate, calcium titanate, sodium titanate, titanium oxide, glass, biocompatible glass, diamond, silicon carbide, calcium phosphate, calcium carbonate, metallic powders, titanium, stainless steel, hardened steel, carbon steel chromium alloys or any combination thereof. Exemplary silicon compounds include amorphous silica, silicic acid, silicon dioxide, fumed silica, and combinations thereof. Such composite particles can be commercially available such as those sold under the trade designation "3M ESPE ROCATEC PLUS" from 3M Co., St. Paul, Minn.". In one embodiment the outer surface of the abrasive particle is substantially covered with silicon compound, for example, at least 75, 80, 90, 95 or even 100% of the abrasive particles surface is covered with the silicon compound. In another embodiment the outer surface of the abrasive particle is partially covered with the silicon compound, e.g., less than 90, 80, 70 or even less than 30% covered.

In one embodiment of the present disclosure, the particles may comprise 0.1% to 20% by weight, 0.5% to 10% by weight, or even 1 to 5% by weight of a silicon compound.

The abrasive impact should be conducted with sufficient energy (particle having sufficient size, and hardness) to either roughen the metal surface and/or breech the oxide layer, allowing a window of opportunity for the siliceous material to be taken up by or incorporated into the metal substrate before the oxide layer reforms around it.

In one embodiment, the abrasive particle has a particle size ranging from 0.1 µm to 10000 µm, such as a particle size ranging from 1 µm to 5000 µm, or a particle size ranging from 10 µm to 1000 µm, or even a particle size ranging from 10 µm to 200 µm.

In one embodiment, the abrasive particle has a Mohs hardness ranging from 3 to 10, such as a Mohs hardness ranging from 4 to 10, or a Mohs hardness ranging from 5 to 10. Ideally the abrasive particle should have a hardness exceeding that of the metal substrate.

The particles are impacted onto the surface of the metal substrate using pressure from a fluid jet. Gaseous carrier fluids such as nitrogen, argon, carbon dioxide, helium, air, and combinations thereof, can be used to deliver the particles to the metal surface. In the present disclosure, the process is conducted in the absence of liquids, which can be advantageous from a cost perspective. For example, there is no need for drying and venting steps required with liquid coatings and no volatile organic solvents are used.

The pressure of the fluid jet will also be a factor in determining the impact energy of the particles. If using multiple types of particles, for example silicon-containing abrasive particles and non-silicon-containing abrasive particles, the particles do not have to be delivered to the surface of the metal substrate through the same jet. More than one fluid jet could be used as long as the silicon-containing abrasive particles and non-silicon-containing abrasive particles are delivered to the surface at substantially the same time. In one embodiment, the silicon-containing abrasive particles and non-silicon-containing abrasive particles are contained in the same reservoir and are delivered to the metal surface from the same jet (nozzle). In another embodiment, the silicon-containing abrasive particles and non-silicon-containing abrasive particles are contained in separate reservoirs, and multiple nozzles deliver the silicon-containing abrasive particles and non-silicon-containing abrasive particles. The multiple nozzles can take the form of a jet within a jet, i.e., the particles from each jet bombard the surface at the same incident angle. In another embodiment, the multiple nozzles are spatially separated so as to bombard the surface at different incident angles yet hit the same spot on the surface simultaneously.

In one embodiment, the at least one fluid jet is selected from dry shot peening machines, dry blasters, wheel abraders, grit blaster(s), sand blasters(s), and micro-blasters. In one embodiment, the at least one fluid jet operates at a pressure ranging from 0.5 to 100 bar, such as a pressure ranging from 1 to 30 bar, or a pressure ranging from 3 to 10 bar.

In other embodiments, blasting equipment can be used in conjunction with controlled motion such as CNC or robotic control.

One of ordinary skill in the art can appreciate the effect of the size, shape, and hardness of the particles used on the extent of impregnation of the silicon compound in the surface using these mixed media.

One of ordinary skill in the art can appreciate the effect of the fluid stream itself, the blasting equipment using a gas medium (typically air) and the effects of using inert gases as a carrier fluid e.g. $N_2$ or noble gases such as Ar and He on the extent of impregnation of the silicon compound in the surface.

After bombarding the surface with the particles to form the silicon compound layer, the silicon compound layer optionally can be sintered and/or baked prior to the application of the fluoropolymer layer.

Although not wanting to be bound by theory, it is believed that the abrasion of the particles on the metal substrate provides some roughening of the substrate surface, which may result in the silicon compound being bound mechanically to the substrate.

After forming the silicon compound layer, a modifying agent and an aqueous fluoropolymer dispersion are applied directly to the silicon compound layer to form a fluoropolymer layer atop the silicon compound layer. In one embodiment, the modifying agent is mixed with the aqueous fluoropolymer dispersion and is applied simultaneously. In another embodiment, the coupling agent is applied first followed by the aqueous fluoropolymer dispersion.

The modifying agents disclosed herein are those compounds, which react with the silicon compound layer and the fluorinated polymer to form a strong adhesive bond between the layers. The fluorinated polymers include a partially fluorinated polymer capable of forming carbon-carbon double bonds, and a fluorinated polymer comprising function groups as discussed above. The aqueous dispersion comprising a fluoropolymer latex and optional additives are blended together and then coated onto the silicon compound layer.

If the fluorinated polymer is made via an aqueous emulsion polymerization process and the raw dispersion (i.e., no coagulation and harvesting of the fluorinated polymer) is used to prepare the coating, the dispersion will typically include an emulsifier. Such emulsifiers may include fluorinated emulsifiers of the general formula: $[R_f—O-L-Y^-]_iX_i^+$ (IV), wherein L represents a linear or branched or cyclic partially or fully fluorinated alkylene group or an aliphatic hydrocarbon group, $R_f$ represents a linear or branched or cyclic, partially or fully fluorinated aliphatic group or a linear or branched partially or fully fluorinated group interrupted with one or more oxygen atoms, $X_i^+$ represents a cation having the valence i and i is 1, 2 and 3 and Y represents COO or $SO_3$, preferably the emulsifiers are carboxylates and Y is COO. Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3$ $OCHFCF_2COOH$, $CF_3O(CF_2)_3OCF_2COOH$, $CF_3(CF_2)_3$ $(CH_2CF_2)_2CF_2CF_2COOH$, $CF_3(CF_2)_2CH_2(CF_2)_2$ $COOH$, $CF_3(CF_2)_2COOH$, $CF_3(CF_2)_2(OCF(CF_3)CF_2)OCF$ (CF$_3$)COOH, CF$_3$(CF$_2$)$_2$(OCF$_2$CF$_2$)$_4$OCF(CF$_3$)COOH, CF$_3$CF$_2$O(CF$_2$CF$_2$O)$_3$CF$_2$COOH, and their salts.

The aqueous dispersion of the present disclosure may include a surfactant, which is used to stabilize the fluorinated polymer particles and prevent settling. Such surfactants include ionic and nonionic surfactants. Preferred aqueous dispersions are concentrated having a reduced fluorinated emulsifier content of less than 10, 5, 2, or even 1 parts per million based on the amount of fluoropolymer solids.

Typical anionic non-fluorinated surfactants that may be added to the aqueous dispersions (not only to adjust the conductivity but also to influence the wetting properties of the dispersions, include surfactants that have an acid group, in particular a sulfonic or carboxylic acid group. Examples of non-fluorinated anionic surfactants include surfactants that have one or more anionic groups. Anionic non-fluorinated surfactants may include in addition to one or more anionic groups, other hydrophilic groups such as polyoxyalkylene groups having 2 to 4 carbons in the oxyalkylene group (for example, polyoxy ethylene groups). Typical non-fluorinated surfactants include anionic hydrocarbon surfactants. The term "anionic hydrocarbon surfactants" as used herein comprises surfactants that include one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic groups. The hydrocarbon moiety may also be aromatic or contain aromatic groups. Additionally, the hydrocarbon moiety may contain one or more hetero-atoms such as for example oxygen, nitrogen and sulfur.

Particular examples of non-fluorinated, anionic hydrocarbon surfactants include alkyl sulfonates such as lauryl sulfonate, alkyl sulfates such as lauryl sulfate, alkylarylsulfonates and alkylarylsulfates, and alkylsulfosuccinates, fatty (carboxylic) acids and salts thereof such as lauric acids and salts thereof and phosphoric acid alkyl or alkylaryl esters and salts thereof. Commercially available anionic hydrocarbon surfactants that can be used include those available under the trade designation Polystep Al 6 (sodium dodecylbenzyl sulphonate) from Stepan Company, Germany; Hostapur SAS 30 (secondary alkyl sulphonate sodium salt), Emulsogen LS (sodium lauryl sulfate) and Emulsogen EPA 1954 (mixture of C2 to C4 sodium alkyl sulfates) each available from Clariant GmbH, Germany; Edenor C-12 (Lauric acid) available from Cognis, Germany; and TRITON X-200 (sodium alkylsulfonate) available from Dow Chemical, Midland, Mich. Further suitable anionic surfactants include the sulfosuccinates disclosed in EP 1538177 and EP 1526142. Mixtures of different anionic surfactants may also be used.

Typical amounts of these surfactants may include from 0.02 to 10% wt. based on the weight of the composition, preferably from 0.01 up to 5% wt. based on weight of polymer, more preferably from 0.05 up to 1% wt. based on weight of polymer in the aqueous fluoropolymer dispersion.

The aqueous fluoropolymer dispersion may contain non-fluorinated non-ionic surfactants. Typically, they contain these surfactants in an amount of from about 1 to 6% weight based on the total weight of the composition, or from 2 to 12% wt. based on the weight of fluoropolymer in the dispersion. The surfactants are non-aromatic. Suitable surfactants include those of the general formula (V): R$_1$O—[CH$_2$CH$_2$O]$_n$—[R$_2$O]$_m$—R$_3$ (V) wherein R$_1$ represents a linear or branched aliphatic hydrocarbon group having at least 8 carbon atoms, preferably 8 to 18 carbon atoms. In formula (V) above R$_2$ represents an alkylene having 3 carbon atoms, R$_3$ represents hydrogen or a C1-C3 alkyl group, n has a value of 0 to 40, m has a value of 0 to 40 and the sum of n+m is at least 1 and preferably n is at least 1. In a preferred embodiment, residue R$_1$ corresponds to (R')(R'')HC— wherein R' and R'' are the same or different, linear, branched or cyclic alkyl residues, R$_3$ is H, and m is 0. Such embodiment includes branched secondary alcohol ethoxylates. Commercially available non-ionic surfactant or mixtures of non-ionic surfactants include those available from Clariant GmbH under the trade designation GENAPOL such as GENAPOL X-080 and GENAPOL PF 40. Branched secondary alcohol ethoxylates are commercially available under the trade designation TERGTIOL TMN from Dow Chemical Company, e.g. Tergitol TMN 6, Tergitol TMN 100× and Tergitol TMN 10 from Dow Chemical Company.

Another suitable class of non-ionic non-fluorinated emulsifiers include ethoxylated amines and amine oxides.

Further non-fluorinated, non-ionic surfactants that can be used include alkoxylated acetylenic diols, for example ethoxylated acetylenic diols. The ethoxylated acetylenic diols for use in this embodiment preferably have a HLB between 11 and 16. Commercially available ethoxylated acetylenic diols that may be used include those available under the trade designation SURFYNOL from Air Products, Allentown, Pa. (for example, SURFYNOL 465). Still further useful non-ionic surfactants include polysiloxane based surfactants such as those available under the trade designation SILWET L77 (Crompton Corp., Middlebury, Conn.).

Other examples of non-ionic surfactants include sugar-based surfactants, such as alkylpolyglycosides and the like. Sugar-based surfactant contain one or more cyclic aliphatic polyols and comprise one or more linear or branched alky chain residue that may optionally be interrupted by oxygen atoms (ether atoms). The linear or branched residues typically include alkyl, alkoxy or polyoxy alkyl residues and may contain at least 6 carbon atoms or at least 8 carbon atoms and typically between 6 to 26 or 8 to 16 carbon atoms. Alkyl glucosides are commercially available under the trade designation GLUCPON from Cognis GmbH, Dusseldorf, Germany.

Another class of non-ionic surfactants includes polysorbates. Polysorbates include ethoxylated, propoxylated or alkoxylated sorbitans and may further contain linear cyclic or branched alkyl residues, such as but not limited to fatty alcohol or fatty acid residues. Useful polysorbates include those available under the trade designation Polysorbate 20, Polysorbate 40, Polysorbate 60 and Polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides.

The aqueous fluoropolymer dispersions also may contain ingredients that can be beneficial when coating the dispersion, such as friction reducing agents, coalescent agents, pigments, mica particles, and the like. Additional optional components include, for example, buffering agents and oxidizing agents as may be required or desired based on the application. In one embodiment, the aqueous fluoropolymer dispersion comprises 0.1 to 100 wt % of the functionalized fluorinated polymer relative to all of the polymers in the aqueous dispersion.

As mentioned above, the coupling agent can be included in the aqueous fluoropolymer dispersion. In another embodiment, the silicon compound is treated prior to contact with the aqueous fluoropolymer dispersion. In one embodiment, a coupling solution is first contacted with the silicon compound layer, followed by application of the aqueous fluoropolymer dispersion. The coupling solution is an aqueous solution comprising the coupling agent. In one embodiment, the aqueous solution comprises a water-alcohol solution. In another embodiment, the aqueous solution does not comprise alcohol. If necessary, the pH of the coupling solution may be adjusted to dissolve the coupling agent. In one embodiment, the coupling solution comprises 0.01 to 5% by weight of the coupling agent.

The aqueous fluoropolymer dispersion and the coupling solution may be applied by any of the known techniques to apply coatings to substrates including for example spray coating, roller coating, curtain coating or coil coating the composition.

Following application of the coating, the multilayer article is generally dried by subjecting the article to elevated temperature of 100 to 300° C. One or more additional layers of non-melt processible PTFE may be then be provided in a similar way. Such one or more layers of PTFE may or may not comprise melt-processible fluoropolymers such as melt-processible copolymers of TFE. When such melt-processible TFE copolymers are used, the ratio thereof may be varied in a multilayer coating so as to create a gradient of increasing amount of PTFE towards the top coating. Likewise, the ratio of the non-fluorinated polymer to the PTFE particles may be varied to create a gradient of decreasing amount of non-fluorinated polymer towards the top coating.

Following application of the one or more coatings, the obtained multi-layered article (comprising the silicon compound layer and the fluoropolymer layer) is sintered (i.e., processed above the melting temperature of the highest melting component, such as a binder or a fluorinated polymer). Generally, sintering is carried out in an oven at a temperature of 350° C. to 450° C., typically from 370° C. to 420° C. The sintering time may vary from 1 to 10 min. and the oven may have a constant temperature or an increasing temperature profile may be used, i.e. the temperature may be increased from an initial lower temperature to a higher temperature later in the baking cycle. Generally, processing of the multilayered article is carried out by conveying the coated article through an oven with an increasing temperature profile from entrance to exit.

In one embodiment, multilayered articles of the present disclosure have sufficient adhesion between the fluoropolymer layer and the metal surface as measured by a cross hatch test.

In one embodiment of the present disclosure, the silicon compound layer is an inorganic layer. In one embodiment, the silicon compound layer is substantially free of a fluoropolymer.

In one embodiment, the multilayered article is substantially free of a binder, meaning that the silicon compound layer, the coupling agent layer (if present), and/or the fluoropolymer layer, comprise less than 0.1, 0.05, or even 0.01% by polymer weight or even no binder, wherein the binder is selected from at least one of polyimides, polyamides, polybenzimidazoles, polyamide-imides, polysulfones, polybismaleimides, liquid crystal polymers, polyethersulfone, polyphenylene sulfide, polybenzoxazine, epoxy resin, polyarylene etherketone, and mixture thereof.

In one embodiment, the multilayered article may further comprise inorganic materials such as carbon black; oxides such as titanium dioxide, silicon dioxide, and magnesium oxide; nitrides such as boron nitride, and silicon nitride; carbides such as silicium carbide; phosphate salts such as sodium, calcium, potassium, and magnesium phosphate; fluorides such as fluorspar and kryolith; tetralkyl ammonium salts; hydroxyl apatite; and combinations thereof. These materials may be added to the fluoropolymer layer, topcoat layer, and/or the coupling agent layer to provide additional properties to the multilayered article.

Exemplary embodiments which are useful for understanding the present disclosure include:

Embodiment 1

A release surface coated substrate made by a process comprising:
delivering particles comprising a silicon compound from at least one fluid jet to a metal surface to embed the metal surface with the silicon compound to form a silicon compound layer;
coating the silicon compound layer with an aqueous fluoropolymer dispersion to form a fluoropolymer layer and thereby forming a multilayered article, wherein the aqueous fluoropolymer dispersion comprises (i) a modifying agent and (ii) a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
sintering the multilayered article to form the release surface coated substrate.

Embodiment 2

The release surface coated substrate of embodiment 1, wherein the modifying agent is selected from a coupling agent, an acitvating agent, and combinations thereof.

Embodiment 3

The release surface coated substrate of embodiment 2, wherein the activating agent is selected from a base, an amine-containing compound, a hydroxyl-containing compound, and combinations thereof.

Embodiment 4

The release surface coated substrate of any one of the previous embodiments, wherein the aqueous fluoropolymer dispersion comprises 0.1 to 50% of the modifying agent relative to the fluorinated polymer.

Embodiment 5

A release surface coated substrate made by a process comprising:
delivering particles comprising a silicon compound from at least one fluid jet to a metal surface to embed the metal surface with the silicon compound to form a silicon compound layer;
coating the silicon compound layer with a coating comprising a coupling agent to form a coupling agent layer;

coating the coupling agent layer with an aqueous fluoropolymer dispersion to form a fluoropolymer layer and thereby forming a multilayered article, wherein the aqueous fluoropolymer dispersion comprises a fluorinated polymer, wherein the fluorinated polymer comprises at least one of (a) a partially fluorinated polymer capable of forming a carbon-carbon double bond, (b) a functionalized fluorinated polymer, and (c) combinations thereof; and sintering the multilayered article to form the release surface coated substrate.

Embodiment 6

The release surface coated substrate of any one of embodiments 2-5, wherein the coupling agent comprises at least one of a silane, a titanate, a zirconate, and combinations thereof.

Embodiment 7

The release surface coated substrate of any one of embodiments 2-5, wherein the coupling agent comprises at least one of: vinyl trimethoxysilane, vinyl triethoxysilane, γ-glycidoxypropyl trimethoxysilane, γ-methacroyloxy propyltrimethoxysilane, tetramethyl divinyl silazane, 3-aminopropyl tri-methoxy silane, and combinations thereof.

Embodiment 8

The release surface coated substrate of any one of the previous embodiments, wherein the aqueous dispersion further comprises a perfluorinated polymer.

Embodiment 9

The release surface coated substrate of any one of the previous embodiments, wherein the aqueous dispersion is substantially free of a binder.

Embodiment 10

The release surface coated substrate of any one of the previous embodiments, wherein the silicon compound comprises at least one of: amorphous silica, silicon dioxide, and combinations thereof.

Embodiment 11

The release surface coated substrate of any one of the previous embodiments, wherein the aqueous fluoropolymer dispersion further comprises an inorganic filler.

Embodiment 12

The release surface coated substrate of any one of the previous embodiments, wherein the aqueous fluoropolymer dispersion comprises at least one of the following fluoropolymers: PTFE, a non-melt processable PTFE, PFA, THV, ETFE, FEP, and blends thereof.

Embodiment 13

The release surface coated substrate of any one of the previous embodiments, wherein the aqueous fluoropolymer dispersion comprises a fluoropolymeric core-shell particle with the fluorinated polymer shell and a perfluorinated polymer core.

Embodiment 14

The release surface coated substrate of any one of the previous embodiments, wherein the functionalized fluorinated polymer comprises at least one of (a) —COX groups, wherein X is OH, ONa, OK, $NH_2$, F, or Cl; (b) —$SO_2$X where X is OH, ONa, OK, $NH_2$, F, or Cl; (c) —$CH_2OSO_2$Y where Y=OH, ONa, or OK; (d) —$CH_2OH$; (e) phosphate group; (f) —CN, (g) a halogen selected from Br, I, and Cl; and (h) combinations thereof.

Embodiment 15

The release surface coated substrate of any one of the previous embodiments, wherein the aqueous fluoropolymer dispersion comprises 0.1 to 100 wt % of the functionalized fluoropolymer relative to all of the polymers in the aqueous dispersion.

Embodiment 16

The release surface coated substrate of any one of the previous embodiments, wherein the particles comprise an abrasive particle having an outer surface comprising the silicon compound.

Embodiment 17

The release surface coated substrate of any one of the previous embodiments, wherein the particles are delivered to the metal surface with a gas.

Embodiment 18

The release surface coated substrate of any one of the previous embodiments, wherein when the aqueous fluoropolymer dispersion comprises a fluorinated polymer having at least 30 reactive groups per 1,000,000 carbon atoms.

Embodiment 19

The release coated substrate of any one of the previous embodiments, wherein the metal substrate includes at least one of steel, high-carbon steel, stainless steel, aluminized steel, aluminum, and aluminum alloys.

Embodiment 20

The release surface coated substrate of any one of the previous embodiments, wherein the particle is selected from silica, alumina, zirconia, barium titanate, calcium titanate, sodium titanate, titanium oxide, glass, biocompatible glass, diamond, silicon carbide, calcium phosphate, calcium carbonate, metallic powders, carbon fiber composites, polymeric composites, titanium, stainless steel, hardened steel, carbon steel chromium alloys, or any combination thereof.

Embodiment 21

The release surface coated substrate of any one of the previous embodiments, further comprising an additional layer that is disposed on top of the fluoropolymer layer.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, min=minute, mm=millimeter, and wt=weight.

Materials Table

| Name | Source |
|---|---|
| Abrasive Particles | 110 micrometer grain size aluminum oxide particles modified with amorphous silica, available under the trade designation "3M ESPE ROCATEC PLUS" from 3M Co., St. Paul, MN |
| Perfluorinated Polymer Dispersion | A non melt-processible PTFE aqueous dispersion available under the trade designation "DYNEON TF 5135 GZ Z PTFE" available from 3M Co., St. Paul, MN comprising 58% solids. |
| Partially Fluorinated Polymer Dispersion | An aqueous dispersion comprising 50% solids made comprising a fluoropolymer having 73.1 wt % TFE, 10.6 wt % HFP, 12.3 wt % VDF, and 4.0 wt % perfluoropropyl vinyl ether, MFI 265° C./5 kg 16 g/10 min, melting point 225° C., and further comprising 5 wt % (based on the amount of fluoropolymer) of a nonionic surfactant sold under the trade designation "TERGITOL TMN-100X" available from Dow Chemical Co., Midland, MI. |
| Additive | An aqueous dispersion containing additives for a topcoat layer available under the trade designation "GREBLON 1 MASTERBATCH" (available from Weilburger Lackfabrik J. Grebe GmbH). |
| Silane Coupling Agent | Tris-(trimethoxysilylpropyl)isocyanurate available as "KBM 9659" from Shin-Etsu Chemical Co., Ltd., Tokyo, Japan. |

Cross Hatch Test

The adhesion of the coatings to the substrate was evaluated using the crosshatch test, in accordance with DIN EN ISO 2409. A crosshatch pattern of 1 mm was made in the coated substrates by using a knife. Adhesive tape (50 mm, available under the trade designation "TESA 4104" from Tesa SE, Hamburg, Germany) was applied as firmly as possible onto the cut lines. The adhesive tape was pulled vertically. After the tape was applied and pulled for 10 times, the appearance of the cut lines was evaluated according to DIN EN ISO 2409 (0=superior; 5=bad coating).

Preparation of Aluminum Plate

A coating unit (available under the trade designation "ROCATEC JUNIOR BONDING SYSTEM" from 3M Co., St. Paul, Minn.) was used to blast Abrasive Particles onto the surface of an aluminum plate. The pressure was adjusted to 4 bar and the distance of the nozzle of the coating unit to the aluminum plate was 20 mm.

After treatment, the roughness of the treated surface of the plate has a surface roughness ($R_a$) of 2.95 micrometers. After this procedure, the plate was cleaned by washing with acetone.

Comparative Example 1

An aluminum plate was prepared as described above.
An aqueous dispersion comprising: 80.1 wt % Perfluorinated Polymer Dispersion, 8.9 wt % Additive, and 11.0 wt % deionized water was spray coated onto the treated surface of the aluminum plate using a spray gun (BINKS Model P-95C, Binks, Glendale Heights, Ill.), with a pressure of 2 bar.

The coated plate was dried at 80° C. for 10 min followed by 10 min at 280° C. and 10 min at 380° C. to evaporate all volatile components.

The multilayer article was then tested on the exposed fluoropolymer layer following the Cross Hatch Test and received an appearance of a 5.

Comparative Example 2

The same process as described in Comparative Example above was followed to make the multilayer article, except the following aqueous dispersion was used: 74.3 wt % Perfluorinated Polymer Dispersion, 6.3% Additive, 10.7 wt % Partially Fluorinated Polymer Dispersion, and 8.7 wt % de-ionized water.

The multilayer article was tested on the exposed fluoropolymer layer following the Cross Hatch Test and received an appearance of a 5.

Example 1

The same process as described in Comparative Example 1 above was followed to make the multilayer article, except that following aqueous dispersion was used: 70.1 wt % Perfluorinated Polymer Dispersion, 10.1 wt % Additive, 6.1 wt % Partially Fluorinated Polymer Dispersion, 5.5 wt % triethanolamine, and 8.2 wt % de-ionized water.

The multilayer article was tested on the exposed fluoropolymer layer following the Cross Hatch Test and received an appearance of a 0.

Example 2

The same process as described in Comparative Example 1 above was followed to make the multilayer article, except that following aqueous dispersion was used: 73.6 wt % Perfluorinated Polymer Dispersion, 10.6 wt % Additive, Partially Fluorinated Polymer Dispersion, 0.9 wt % Silane Coupling Agent, and 8.6 wt % de-ionized water.

The multilayer article was tested on the exposed fluoropolymer layer following the Cross Hatch Test and received an appearance of a 1.

Example 3

The same process as described in Comparative Example 1 above was followed to make the multilayer article, except that following aqueous dispersion was used: 69.6 wt % Perfluorinated Polymer, 10.0 wt % Additive, 5.9 wt % Partially Fluorinated Polymer, 5.4 wt % triethanolamine, 0.9 wt % Silane Coupling Agent, and 8.2 wt % de-ionized water.

The multilayer article was tested on the exposed fluoropolymer layer following the Cross Hatch Test and received an appearance of a 0.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A release surface coated substrate made by a process comprising:
   delivering abrasive particles comprising a silicon compound from at least one gaseous fluid jet in the absence of liquids to a metal surface to embed the metal surface with the silicon compound to form a silicon compound layer, wherein the abrasive particles have a particle size ranging from 0.1 to 10000 microns and a Mohs hardness of from 3 to 10;
   coating the silicon compound layer with an aqueous fluoropolymer dispersion to form a fluoropolymer layer and thereby forming a multilayered article, wherein the aqueous fluoropolymer dispersion comprises (i) a modifying agent and (ii) a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
   sintering the multilayered article to form the release surface coated substrate.

2. The release surface coated substrate of claim 1, wherein the modifying agent is selected from a coupling agent, an activating agent, and combinations thereof.

3. The release surface coated substrate of claim 2, wherein the activating agent is selected from a base, an amine-containing compound, a hydroxyl-containing compound, and combinations thereof.

4. The release surface coated substrate of claim 3, wherein the aqueous fluoropolymer dispersion comprises 0.1 to 30% by weight of the activating agent relative to the fluorinated polymer.

5. A release surface coated substrate made by a process comprising:
   delivering abrasive particles comprising a silicon compound from at least one gaseous fluid jet in the absence of liquids to a metal surface to embed the metal surface with the silicon compound to form a silicon compound layer, wherein the abrasive particles have a particle size ranging from 0.1 to 10000 microns and a Mohs hardness of from 3 to 10;
   coating the silicon compound layer with a coating comprising a coupling agent to form a coupling agent layer;
   coating the coupling agent layer with an aqueous fluoropolymer dispersion to form a fluoropolymer layer and thereby forming a multilayered article, wherein the aqueous fluoropolymer dispersion comprises a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
   sintering the multilayered article to form the release surface coated substrate.

6. The release surface coated substrate of claim 2, wherein the coupling agent comprises at least one of a silane, a titanate, a zirconate, and combinations thereof.

7. The release surface coated substrate of claim 2, wherein the coupling agent comprises at least one of: a trimethoxy silane, a triethoxy silane, and combinations thereof.

8. The release surface coated substrate of claim 2, wherein the coupling agent comprises at least one of: vinyl trimethoxysilane, vinyl triethoxysilane, γ-glycidoxypropyl trimethoxysilane, γ-methacroyloxy propyltrimethoxysilane, tetramethyl divinyl silazane, 3-aminopropyl tri-methoxy silane, and combinations thereof.

9. The release surface coated substrate of claim 1, wherein the aqueous fluoropolymer dispersion is substantially free of a binder.

10. The release surface coated substrate of claim 1, wherein the silicon compound comprises at least one of: amorphous silica, silicic acid, silicon dioxide, and combinations thereof.

11. The release surface coated substrate of claim 1, wherein the aqueous fluoropolymer dispersion comprises a fluoropolymeric core-shell particle with the fluorinated polymer shell and a perfluorinated polymer core.

12. The release surface coated substrate of claim 1, wherein the functionalized fluorinated polymer comprises at least one of (a) —COX groups, wherein X is OH, ONa, OK, $NH_2$, F, or Cl; (b) —$SO_2$X where X is OH, ONa, OK, $NH_2$, F, or Cl; (c) —$CH_2OSO_2$Y where Y=OH, ONa, or OK; (d) —$CH_2$OH; (e) phosphate group; (f) —CN, (g) a halogen selected from Br, I, and Cl; and (h) combinations thereof.

13. The release surface coated substrate of claim 1, wherein the particles comprise an abrasive particle having an outer surface comprising the silicon compound.

14. The release surface coated substrate of claim 1, wherein the aqueous fluoropolymer dispersion further comprises an inorganic filler.

15. The release surface coated substrate of claim 1, wherein when the aqueous fluoropolymer dispersion comprises a fluorinated polymer having at least 30 reactive groups per 1,000,000 carbon atoms.

16. The release surface coated substrate of claim 1, wherein the metal substrate includes at least one of steel, high-carbon steel, stainless steel, aluminized steel, aluminum, and aluminum alloys.

17. The release surface coated substrate of claim 1, wherein the particle is selected from silica, alumina, zirconia, barium titanate, calcium titanate, sodium titanate, titanium oxide, glass, biocompatible glass, diamond, silicon carbide, calcium phosphate, calcium carbonate, metallic powders, carbon fiber composites, polymeric composites, titanium, stainless steel, hardened steel, carbon steel chromium alloys, or any combination thereof.

18. The release surface coated substrate of claim 1, further comprising an additional layer that is disposed on top of the fluoropolymer layer.

19. A process for making a release surface coated substrate comprising:
   delivering abrasive particles comprising a silicon compound from at least one gaseous fluid jet in the absence of liquids to a metal surface to embed the metal surface with the silicon compound to form a silicon compound layer, wherein the abrasive particles have a particle size ranging from 0.1 to 10000 microns and a Mohs hardness of from 3 to 10;
   coating the silicon compound layer with an aqueous fluoropolymer dispersion to form a fluoropolymer layer and thereby forming a multilayered article, wherein the aqueous fluoropolymer dispersion comprises (i) a modifying agent and (ii) a fluorinated polymer, wherein the fluorinated polymer comprises at least one of (a) a partially fluorinated polymer capable of forming a carbon-carbon double bond, (b) a functionalized fluorinated polymer, and (c) combinations thereof; and
   sintering the multilayered article to form the release surface coated substrate.

20. A process for making a release surface coated substrate comprising:

delivering abrasive particles comprising a silicon compound from at least one gaseous fluid jet in the absence of liquids to a metal surface to embed the metal surface with the silicon compound to form a silicon compound layer, wherein the abrasive particles have a particle size ranging from 0.1 to 10000 microns and a Mohs hardness of from 3 to 10;

coating the silicon compound layer with a coating comprising a coupling agent to form a coupling agent layer;

coating the coupling agent layer with an aqueous fluoropolymer dispersion to form a fluoropolymer layer and thereby forming a multilayered article, wherein the aqueous fluoropolymer dispersion comprises a fluorinated polymer, wherein the fluorinated polymer comprises at least one of (a) a partially fluorinated polymer capable of forming a carbon-carbon double bond, (b) a functionalized fluorinated polymer, and (c) combinations thereof; and sintering the multilayered article to form the release surface coated substrate.

* * * * *